Nov. 1, 1960 P. M. FISCHER 2,958,816
SATURABLE REACTOR MOTOR CONTROL CIRCUITS
Filed May 13, 1954 2 Sheets-Sheet 1

Inventor
Paul M. Fischer
By Grover A. Frater
Attorney

United States Patent Office 2,958,816
Patented Nov. 1, 1960

2,958,816

SATURABLE REACTOR MOTOR CONTROL CIRCUITS

Paul M. Fischer, Milwaukee, Wis., assignor to Cutler-Hammer, Inc., Milwaukee, Wis., a corporation of Delaware Filed May 13, 1954, Ser. No. 429,551

15 Claims. (Cl. 318—493)

This invention relates to improvements in saturable reactor control circuits and to motor control circuits employing saturable reactor control circuits.

A primary object of the invention is to provide improved saturable reactor control circuits for use in performing switching functions.

Another object is to provide improved self-maintaining switching units to be employed as elements of electrical control systems.

Another object is to provide an improved control circuit for electric motors or the like in which a minimum number of electromagnetic switching elements are required.

A more specific object of the invention is to provide an improved motor control circuit including automatic acceleration control of the motor.

Various other objects and advantages of the invention will hereinafter appear.

Certain embodiments of the invention are illustrated diagrammatically in the accompanying drawing, it being understood that various modifications may be made in the embodiments illustrated and that other embodiments of the invention are possible without departing from the scope of the appended claims.

Figure 1:
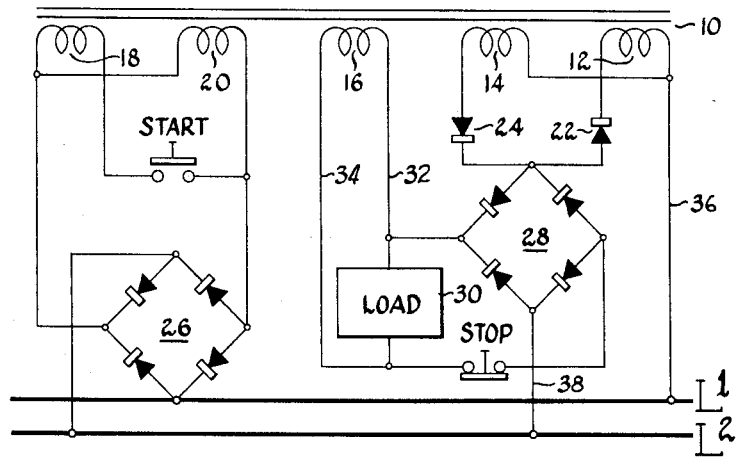
Figure 1 illustrates diagrammatically a control circuit embodying the invention.

Referring to Fig. 1, the circuit there shown comprises: a saturable reactor 10 having a magnetic core, power windings 12 and 14, a control or maintaining winding 16, a control winding 18 and a bias winding 20; half-wave power rectifier elements 22 and 24; bridge rectifiers 26 and 28; a Stop switch; a Start switch; a load represented by the numeral 30 and an alternating power source represented by the symbols L1 and L2.

Bridge rectifier 26 is connected to source L1–L2 and supplies unidirectional power to bias winding 20 and, provided the Start switch is closed, to control winding 18.

Power windings 12 and 14 are connected across supply L1–L2 in series with bridge rectifier 28 and a respectively associated one of power rectifiers 22 and 24. The latter are arranged so that power flows in the respective power windings 12 and 14 on opposite half cycles of the source voltage. However, when the core of reactor 10 is not saturated, the reactance of power windings 12 and 14 is sufficiently great so that substantially no current can flow in said power windings.

Upon closure of the Start switch, unidirectional current flows in control winding 18 and the core of reactor 10 is saturated with magnetism. Thereafter current does flow in power windings 12 and 14 and alternating current flows in bridge rectifier 28 wherein it is rectified and applied through the Stop switch to load 30 and maintaining winding 16 in parallel connection. The flow of current in maintaining winding 16 is sufficient to saturate the reactor core and will maintain the core saturated when the Start switch is opened.

To stop the flow of current to load 30, the Stop switch is opened. The flow of maintaining current in winding 16 is also interrupted and can only be reestablished by releasing or closing the Stop switch and depressing or closing the Start switch.

If preferred, the Stop switch may be connected in conductor 32 and 34 so that the switch need not interrupt the heavy unidirectional current to load 30. Or, it may be connected in alternating supply conductor 36 and 38. An example of the latter described connection is shown in Fig. 2.

Figure 2:
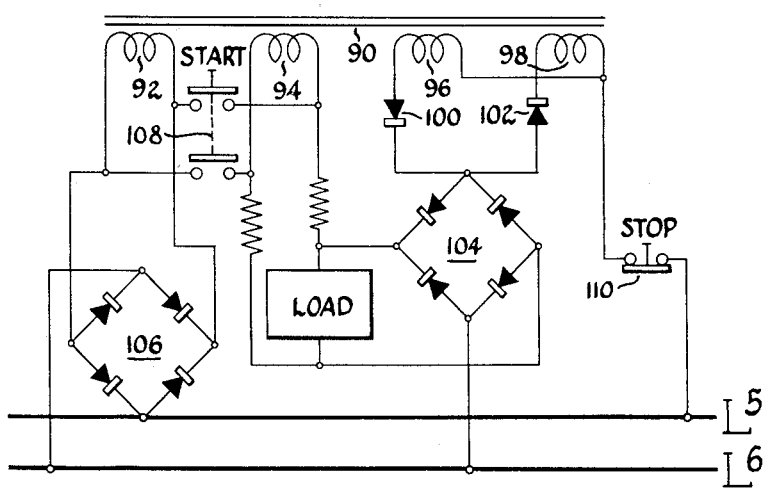
Fig. 2 illustrates diagrammatically a modification of the control circuit of Fig. 1.

The circuit illustrated in Fig. 2 is similar to the circuit of Fig. 1. It comprises an alternating supply source represented by lines L5 and L6; a saturable reactor 90 having a magnetic core, a bias winding 92, a control or maintaining winding 94 and power windings 96 and 98; bridge rectifiers 104 and 106; a Start switch 108 and a Stop switch 110. The control windings 96 and 98 are connected in series with half-wave power rectifiers 100 and 102, respectively.

The operation of this circuit differs from the operation of the circuit of Fig. 1, only in that winding 94 of this circuit performs the functions of both winding 16 and 18 of the circuit of Fig. 1. Upon closure of Start switch 108, unidirectional current is supplied to winding 94 from bridge rectifier 106. The reactor 90 is saturated or partly saturated and the reactance of windings 96 and 98 is reduced. Current then flows through bridge rectifier 104 to winding 94. Thereafter the Start switch may be opened and the reactor will be maintained saturated by winding 94 until the Stop switch 110 is opened.

If the load in Fig. 1 or Fig. 2 is to be supplied alternating rather than unidirectional power, the load would be connected to the input terminals instead of to the output terminals of its associated bridge rectifier.

In addition to serving as complete controllers, these circuits are especially useful as elements in more complex controllers. One example of successful employment of these circuits in a more complex control circuit is their use in a machine controller where safety considerations precluded the use of electromagnetic contactors. This controller is described in Paul M. Fischer and Verne H. Simpson co-pending application Serial No. 429,586 for Interlocked Electric Controller, filed May 13, 1954, and assigned to Cutler-Hammer, Inc., the assignee of this invention.

Figure 3:
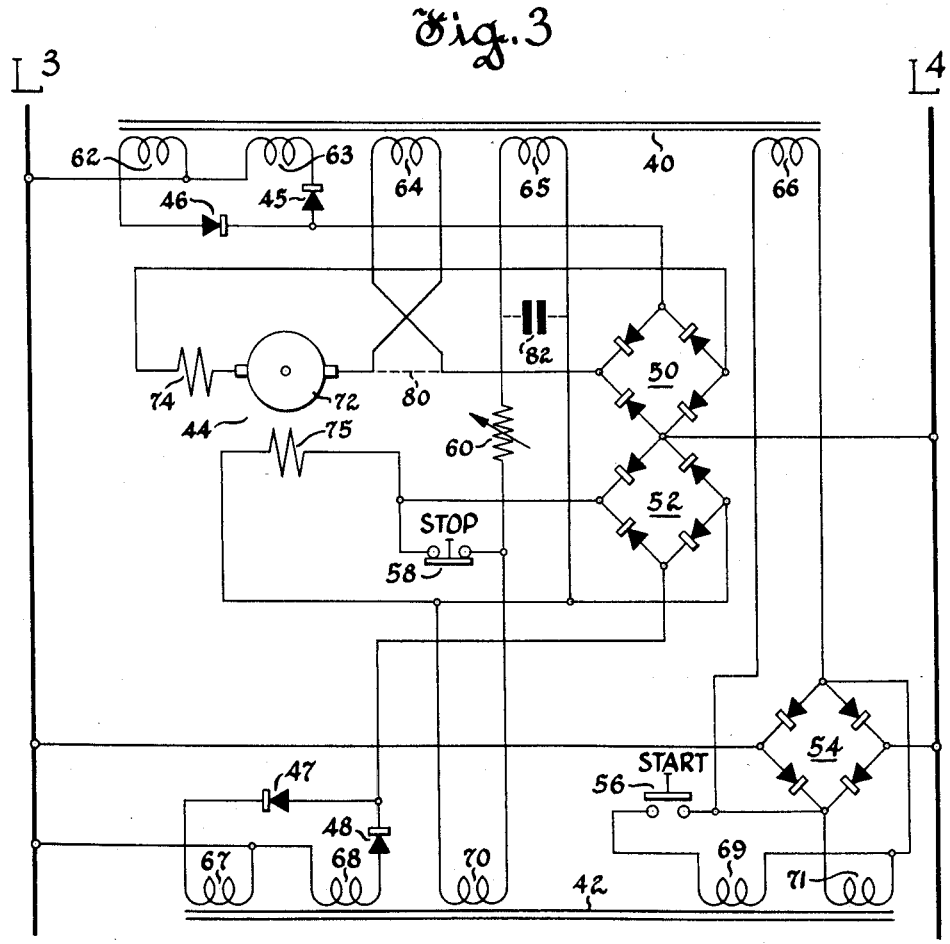
Fig. 3 illustrates diagrammatically another control circuit embodying the invention.

Another controller in which the circuit of the Fig. 1 is employed is illustrated in Fig. 3.

This controller is energized from a source of alternating power designated L3 and L4 and it comprises: saturable reactors 40 and 42; a motor 44; power rectifiers 45, 46, 47 and 48; bridge rectifiers 50, 52 and 54; a Start switch 56; a Stop switch 58 and a variable resistor 60.

The reactor 40 includes a magnetic core, power windings 62 and 63, control windings 64 and 65 and a bias winding 66. Reactor 42 includes a magnetic core, power windings 67 and 68, a control winding 69, a control or maintaining winding 70 and a bias winding 71. The motor 44 has an armature 72, a shunt field winding 75 and a series field winding 74.

Current from lines L3 and L4 is rectified in bridge rectifier 54 and is supplied to bias windings 66 and 71 and, when Start switch 54 is closed, to control winding 69. Thus energized, winding 69 causes the core of reactor 42 to become saturated with magnetism. The reactance of power windings 67 and 68 is then reduced sufficiently to permit full current conduction in the motor field supply circuit which may be traced from line L3 through winding 67 and power rectifier 47 and through winding 68 and power rectifier 48, and thence through bridge rectifier 52 to line L4. Shunt field winding 75 of the motor 44 is connected across the output terminals of bridge rectifier 52 and is energized with unidirectional current.

Maintaining winding 70 of reactor 42 is connected, in series with Stop switch 58, across the field winding 75. Winding 70 is energized sufficiently by current output from bridge rectifier 52 to maintain reactor 42 saturated so that hte Start switch may be released or opened. Control winding 65 of reactor 40, connected in series with variable resistor 60 and Stop switch 58, is also connected in shunt with field winding 75 across the output terminals of bridge rectifier 52. The output voltage of bridge rectifier 52 is fixed so that the degree of saturation of reactor 40 is determined by the effective resistance of resistor 60.

To the extent that reactor 40 is saturated, the reactance of power windings 62 and 63 is reduced and current is permitted to flow through said windings and power rectifiers 46 and 45 during respective alternate half-cycles of the source voltage. This current is rectified in bridge rectifier 50 and is applied as unidirectional current to winding 64, armature 72 and field winding 74 which are connected in series across the output terminals of bridge rectifier 50.

Winding 64 is arranged so that when energized it produces magnetism tending to oppose saturation of the reactor 40. Large inrush currents, which flow to the armature 72 during accelleration of the motor, flow through winding 64 and act to increase the reactance of power windings 62 and 63 thus to limit the magnitude of said inrush currents. "Time-limit" acceleration may be provided by short-circuiting winding 64 as shown by dashed-line 80 and adding a capacitor as indicated at 82.

I claim:

1. In a motor control circuit, a direct current motor having an armature and a field winding, a first saturable reactor unit comprising a magnetic core and a control winding and a pair of power windings and a pair of oppositely conductive half-wave rectifying elements connected in a parallel circuit in each branch of which one of said rectifying elements and one of said power windings are connected in series, means including the parallel circuit for energizing said field winding of the motor and said control winding when said core is magnetized, said control winding and said power windings acting when energized to maintain said core saturated, means to initiate saturation of said core, a second saturable reactor unit comprising a magnetic core and a power winding and a control winding, means including said power winding of said second reactor unit to energize said armature of the motor when the core of said second reactor is magnetized, and said control winding of said second reactor unit being connected for energization by said means for energizing the field winding when the core of said first reactor unit is saturated.

2. The circuit defined in claim 1 in which said second reactor unit includes a second control winding connected in series circuit with said armature and acting when energized to oppose the action of said control winding first mentioned of said second reactor unit.

3. The circuit defined in claim 1 including a stop switch in circuit with said means first mentioned to interrupt excitation of said control winding of said first reactor unit.

4. In a motor control circuit, in combination, a direct current motor having a field winding and an armature, a field control saturable reactor and an armature control saturable reactor each having a magnetic core and a control winding and a pair of power windings, said power windings of each reactor being connected in an associated parallel circuit each branch of which comprises the series combination of one of the power windings and one of a pair of oppositely polarized half-wave rectifying elements, a source of alternating electrical power, a pair of rectifier units for association with said field control and said armature control reactors respectively and each having alternating power input terminals connected across said source in series with the parallel circuit of its associated reactor and each further having a pair of unidirectional power output terminals connected to the field winding and armature of the motor respectively, said control winding of both reactors being connected to the unidirectional output terminals of the rectifier connected to said field winding, said power windings having reactance to oppose current flow therethrough unless their asociated cores are saturated, said power and control winding of the field control reactor when the core of the field winding is saturated acting to maintain the same saturated, means to initiate saturation of the core of said field control reactor, and said armature control reactor having a second control winding connected to be subjected to a current proportional to the current in said armature and acting when energized to oppose the action of the first mentioned control winding of said armature control reactor.

5. In an electrical control system having a saturable reactor comprising a magnetic core and power windings and a bias winding on said core, a source of electrical power, means for applying electrical power from said source to energize said bias winding, means for applying electrical power from said source to energize said power windings following initial saturation of said core, control winding means, first and second circuits for energizing said control winding means from said source, switch means in said first circuit for momentarily energizing said control winding means to saturate said core, said second circuit being automatically effective upon saturation of said core to energize said control winding means to maintain said core saturated independently of said first circuit, a load in circuit with said power windings, said load being energized concurrently with saturation of said core, and switch means for momentarily interrupting said second circuit to terminate saturation of said core thereby to deenergize said load, said load remaining deenergized until said switch means in said first circuit is reoperated to reinitiate saturation of said core.

6. In an electrical control system having a saturable reactor comprising a magnetic core and a pair of power windings and a bias winding on said core, a source of alternating current, means comprising a first full-wave rectifier means for applying rectified alternating current from said source to energize said bias winding, means comprising a second full-wave rectifier means for applying rectified alternating current from said source to energize said power windings following initial saturation of said core, said power windings having oppositely poled half-wave rectifier means in circuit therewith providing alternate energization of said power windings, control winding means, first and second circuits for energizing said control winding means, switch means in said first circuit for momentarily energizing said control winding means to saturate said core, said second circuit being effective upon saturation of said core to energize said control winding means to maintain said core saturated independently of said first circuit, a load in said second circuit in parallel connection with said control winding means, said load being energized concurrently with saturation of said core, and switch means for momentarily interrupting said second circuit to terminate saturation of said core thereby to deenergize said load.

7. In combination, a source of alternating electrical power, a saturable reactor having a magnetic core and a pair of power windings and a bias winding and a control winding, means for applying to said bias winding a unidirectional current from said source for preventing saturation of said core, a rectifier having alternating power input terminals connected to said source and unidirectional power output terminals connected to said control winding, a parallel circuit connected to said output terminals of said rectifier each branch of which includes one of said power windings and a half-wave rectifier unit, the half-wave rectifier units having polarity to permit current flow in said power windings alternately, said power windings having reactance to oppose the flow of current therein when said core is unsaturated, means for momentarily applying to said core a magnetic field for initially saturating said core, said power windings and said control winding acting in response to said initial saturation of said core to maintain said core saturated independently of said initial magnetic field, and a switch for interrupting the connection from said source to said control winding, momentary opening of said switch terminating saturation of said core requiring reapplication of said initial magnetic field to again saturate said core.

8. The combination defined in claim 7, wherein said means for momentarily applying to said core a magnetic field comprises a starting control winding on said core, a rectifier, and a switch for momentarily connecting the unidirectional output terminals of said rectifier to said starting control winding.

9. The combination according to claim 7, wherein said means for momentarily applying to said core a magnetic field comprises a rectifier and a switch for momentarily connecting the unidirectional output terminals of said rectifier to said control winding.

10. An electric controller comprising input mains at constant potential, and supplying potential to output mains normally at a minimum value; the controller comprising a control for varying the output potential; the control comprising a normally open and a normally closed control circuit; the controller constructed to respond to momentary closing of the normally open control circuit to thereupon abruptly raise the output potential to a maximum value, and maintain it at that value upon again opening the circuit; and constructed to respond to momentary opening of the normally closed control circuit to thereupon abruptly lower the output potential to said normal minimum value and maintain it at that value upon again closing the circuit; means to supply energization to the control circuits; and control switch means comprising contacts for effecting opening and closing of the control circuits directly on the contacts.

11. In a current controller a pair of reactor windings on respective cores; the windings connected to alternating potential mains through rectifiers and connected to a pair of output mains to supply unidirectional potential to the output mains; control winding means and means to energize the same unidirectionally and being disposed to exert a first influence on the core flux in the reactor windings, to cause the potential of the output mains to be at a high value; a first operable switch which in restored condition directly controls energization of the control winding means, and which upon momentary operation thereof, exerts a second influence on the flux of the reactor windings to cause the potential of the output mains to fall abruptly to a low value and which upon immediately restoring again does not thereupon again influence the flux; a second operable switch directly controlling energization of the control winding means and which upon momentary operation thereof exerts said first influence on the flux of the reactor windings to cause the potential of the output mains to abruptly rise to said high value, and which upon immediately restoring again does not again influence the flux.

12. In a current controller a pair of reactor windings on respective cores; the windings connected to alternating potential mains through rectifiers and connected to a pair of output mains to supply unidirectional potential to the output mains; control winding means and means to energize the same unidirectionally and being disposed to exert a first influence on the core flux in the reactor windings, to cause the potential of the output mains to be at a high value; a first operable switch which in closed condition directly controls said energization of the control winding means, and which upon momentary opening thereof, exerts a second influence on the flux of the reactor windings to cause the potential of the output means to fall abruptly to a low value and which upon immediately closing again does not thereupon again influence the flux; a second operable switch directly controlling energization of the control winding means and upon momentary closure thereof exerting said first influence on the flux of the reactor windings to cause the potential of the output mains to abruptly rise to said high value, and which upon again immediately opening does not thereupon again influence the flux.

13. An electric controller comprising a core and a pair of reactor windings thereon, connected across an alternating potential supply and through rectifiers, and to a pair of output mains to supply unidirectional potential across the output mains; a source of unidirectional potential; windings on the core comprising: a biasing winding wound in opposition to the reactor windings and always energized from the source; and causing the output potential to be normally at a minimum value; an anti-biasing winding connected to the source through a first control switch in opposition to the biasing winding; a sustaining winding wound in the same direction as the anti-biasing winding and connected to be energized at the potential of the output mains; the controller responding to energization of the anit-biasing winding, effected by momentary closure of the first control switch, to cause the output potential to rise and correspondingly increase energization of the sustaining winding, and responding to the resulting increased energization of the sustaining winding to cause the output potential to go on rising to a maximum value, and be maintained at that value; the controller responding to momentary de-energization of the sustaining winding to cause the output potential to fall to said minimum value; and a second control switch operable to de-energize the sustaining winding.

14. The controller described in claim 13 and in which the second control switch is in the circuit of the sustaining winding; and the controller responds to cause the output potential to fall to said minimum value and be maintained thereat, upon momentary opening of the second control switch.

15. The controller described in claim 13 and in which the second control switch is in the path of alternating potential supply to the reactor windings, and the controller responds to cause the output potential to fall to said minimum value and be maintained thereat, upon momentary opening of the second control switch.

References Cited in the file of this patent

UNITED STATES PATENTS

| | | |
|---|---|---|
| 1,940,335 | Suits | Dec. 19, 1933 |
| 2,027,312 | Fitzgerald | Jan. 7, 1936 |
| 2,276,822 | Bowman | Mar. 17, 1942 |
| 2,337,253 | Lamm | Dec. 21, 1943 |
| 2,414,936 | Edwards et al. | Jan. 28, 1947 |
| 2,429,827 | Lamm | Oct. 28, 1947 |
| 2,518,865 | Cortotto | Aug. 15, 1950 |
| 2,594,372 | Wattenberger | Apr. 29, 1952 |
| 2,600,308 | Lund et al. | June 10, 1952 |
| 2,625,677 | Landau | Jan. 13, 1953 |
| 2,629,847 | Eames et al. | Feb. 24, 1953 |
| 2,677,088 | Maluk | Apr. 27, 1954 |
| 2,709,774 | Wells | May 31, 1955 |